Feb. 16, 1954  G. A. SNOW ET AL  2,669,397
BOBBIN REPLENISHING MECHANISM FOR WINDING MACHINES
Filed Aug. 9, 1952  9 Sheets-Sheet 1
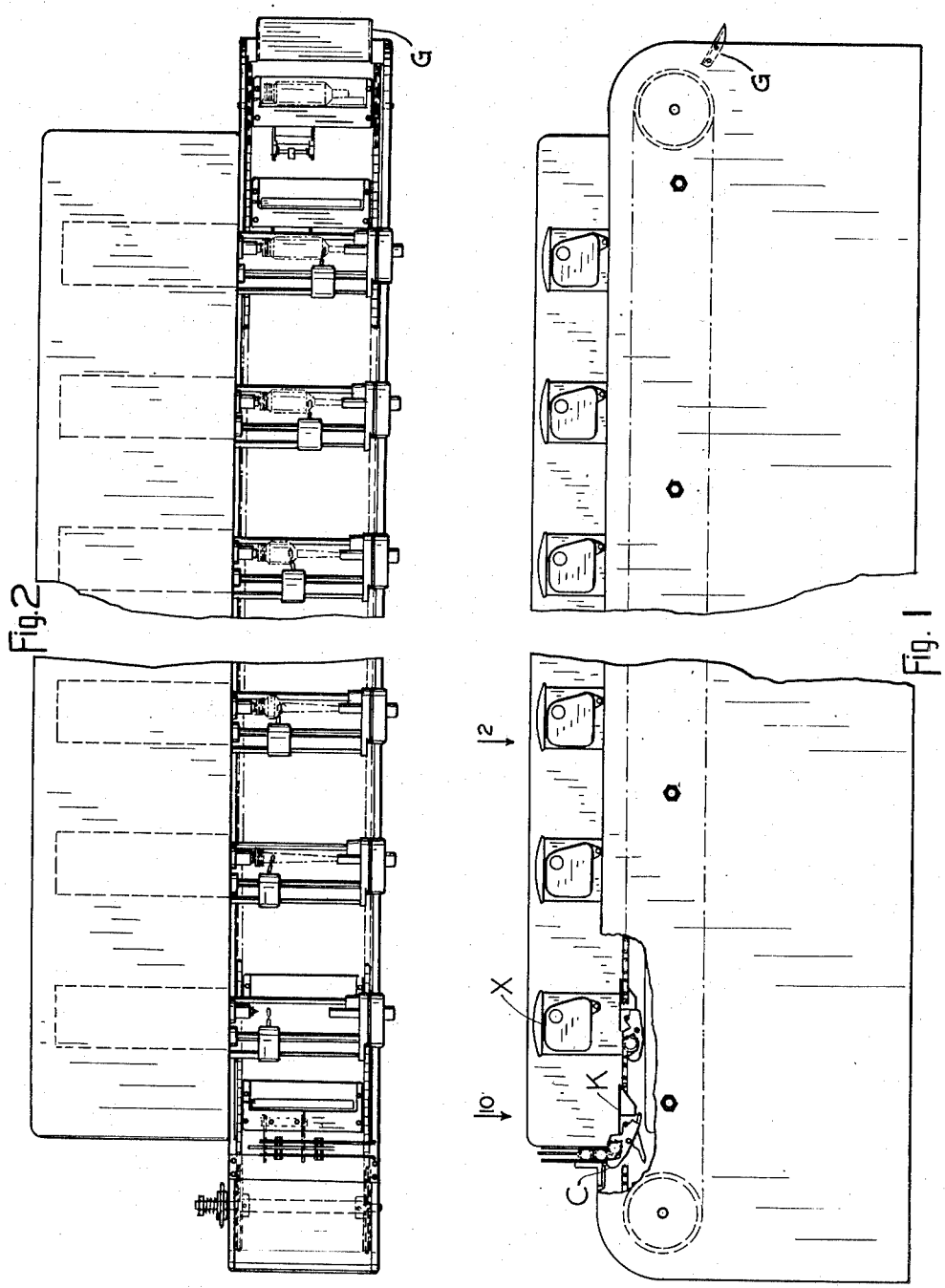
INVENTOR.
GERALD A. SNOW,
HAROLD H. TREBES.
BY
Chas. T. Hawley
ATT'Y.

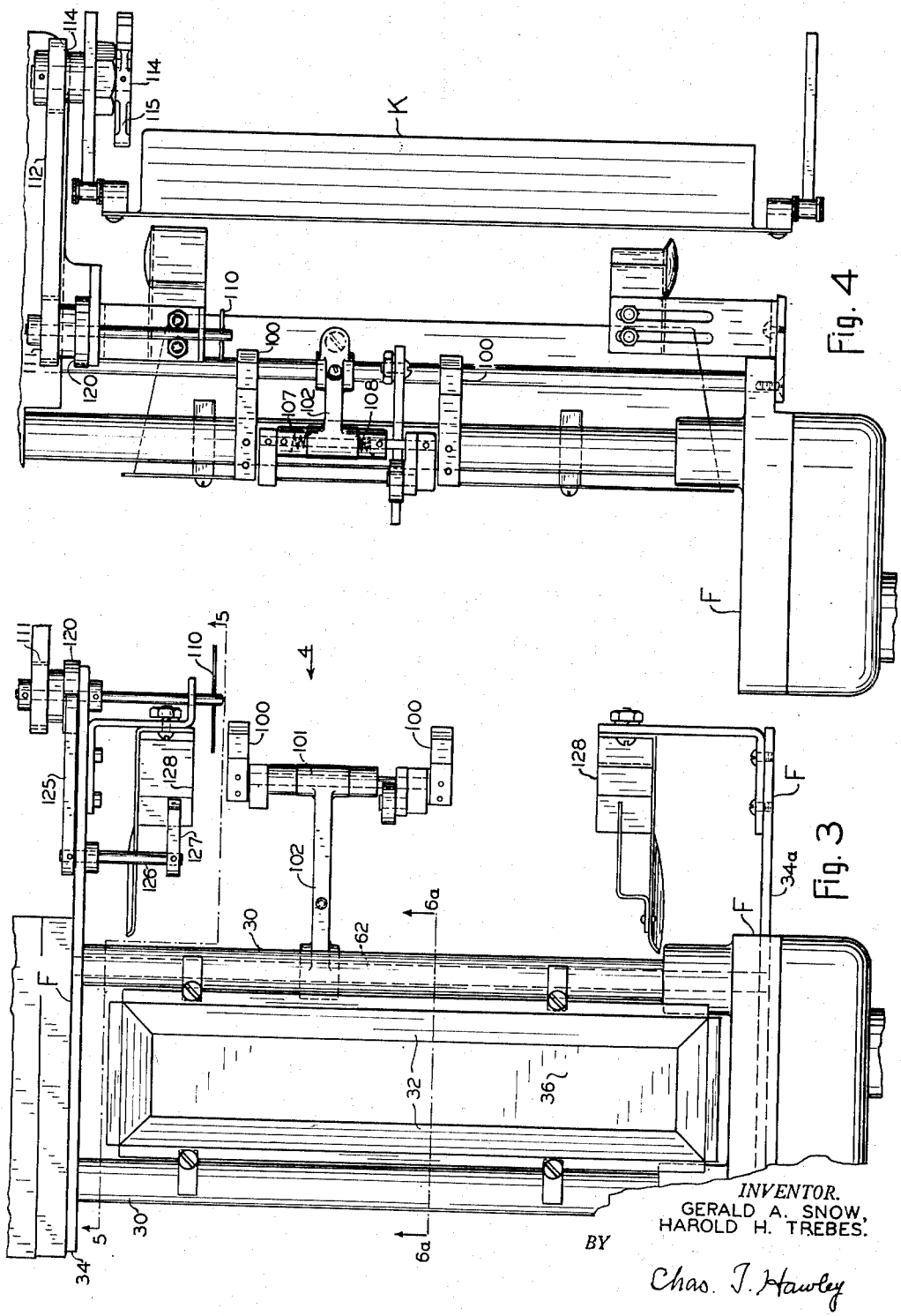

Feb. 16, 1954  G. A. SNOW ET AL  2,669,397
BOBBIN REPLENISHING MECHANISM FOR WINDING MACHINES
Filed Aug. 9, 1952  9 Sheets-Sheet 3

INVENTOR.
GERALD A. SNOW,
HAROLD H. TREBES.
BY
Chas. T. Hawley
ATT'Y.

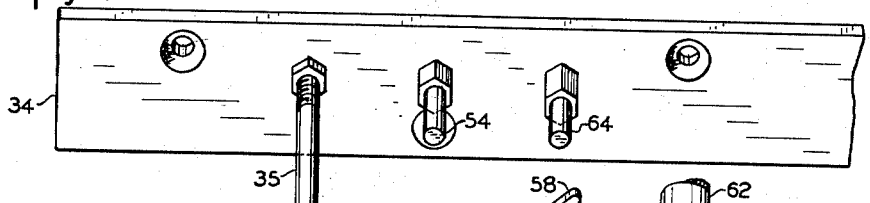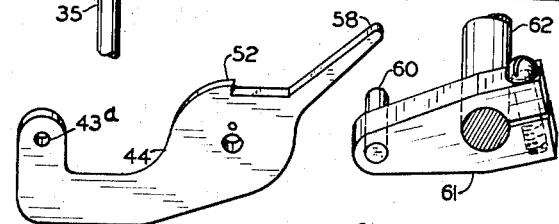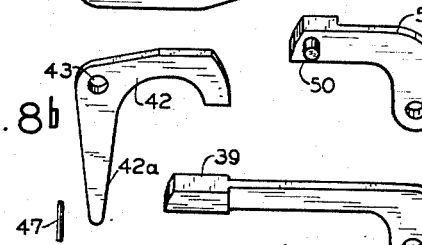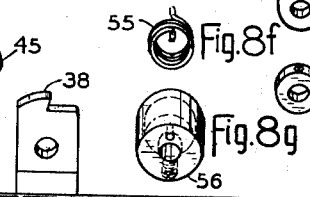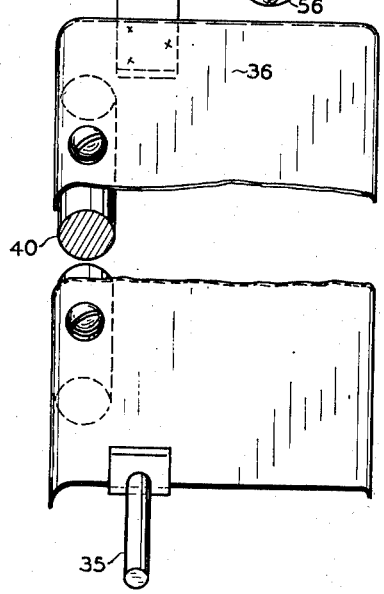

Feb. 16, 1954  G. A. SNOW ET AL  2,669,397
BOBBIN REPLENISHING MECHANISM FOR WINDING MACHINES
Filed Aug. 9, 1952  9 Sheets-Sheet 5
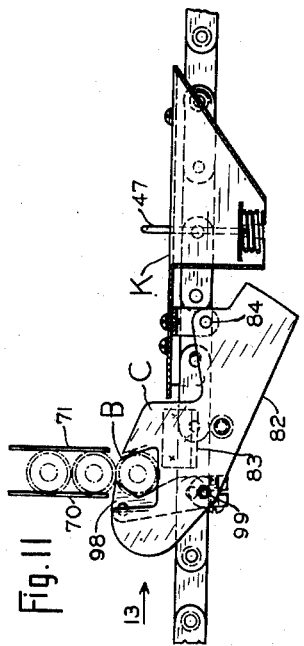
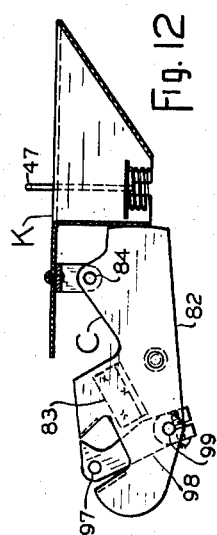
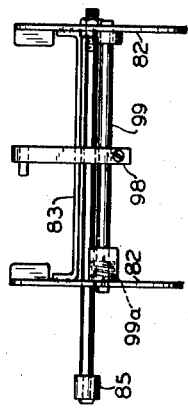
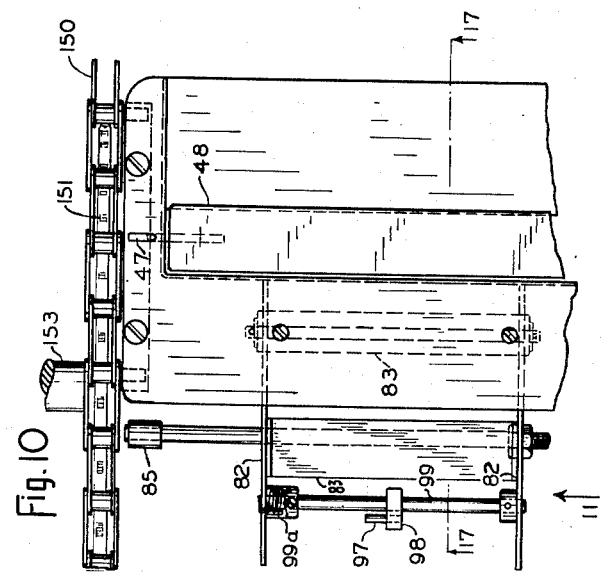
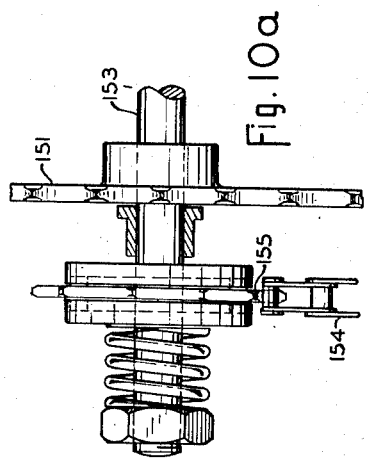
INVENTOR.
GERALD A. SNOW,
HAROLD H. TREBES.
BY
Chas. T. Hawley
ATTY.

Feb. 16, 1954  G. A. SNOW ET AL  2,669,397
BOBBIN REPLENISHING MECHANISM FOR WINDING MACHINES
Filed Aug. 9, 1952  9 Sheets-Sheet 6
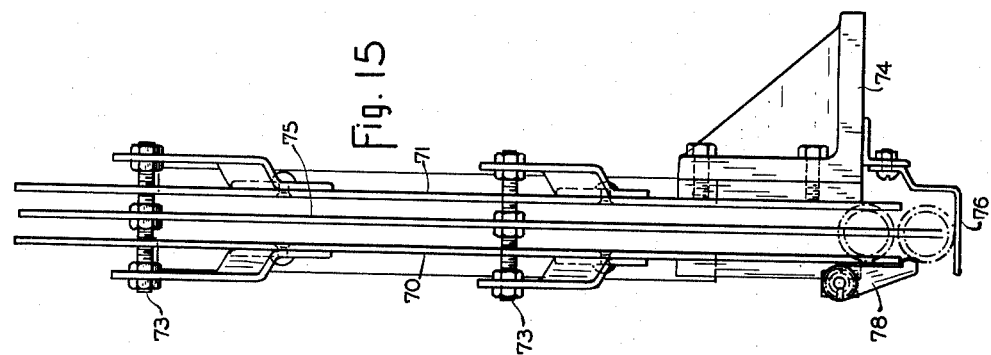
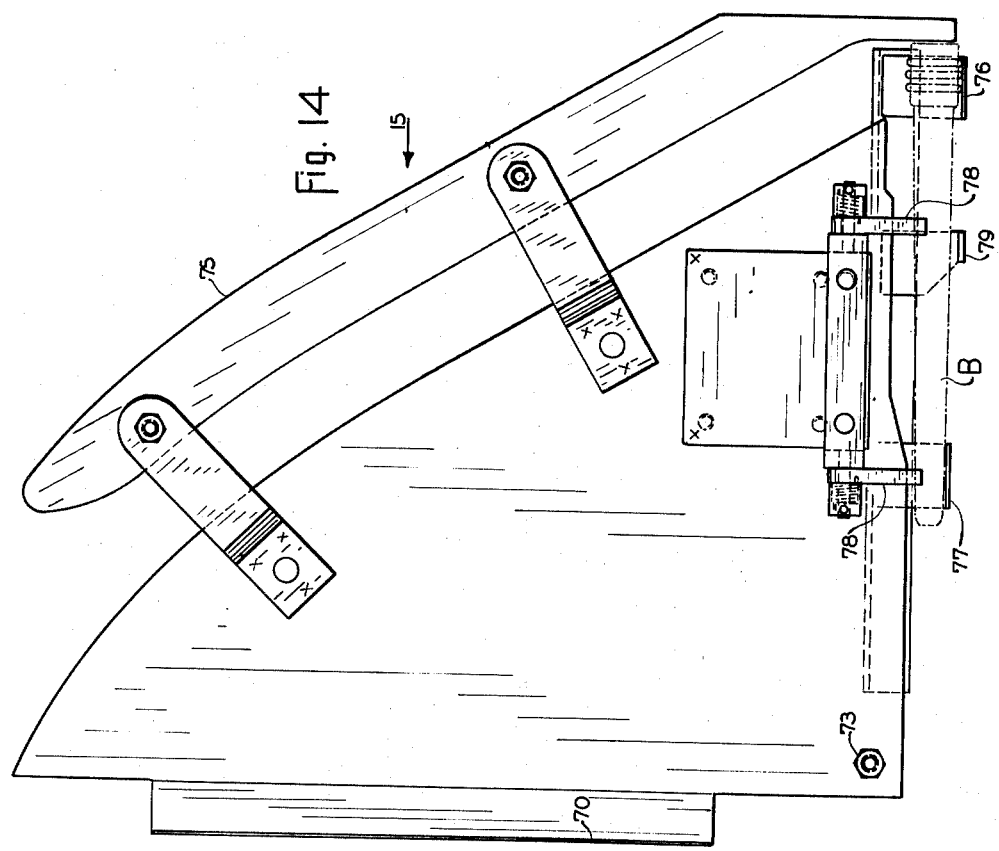
INVENTOR.
GERALD A. SNOW,
HAROLD H. TREBES.
BY
Chas. T. Hawley
ATT'Y.

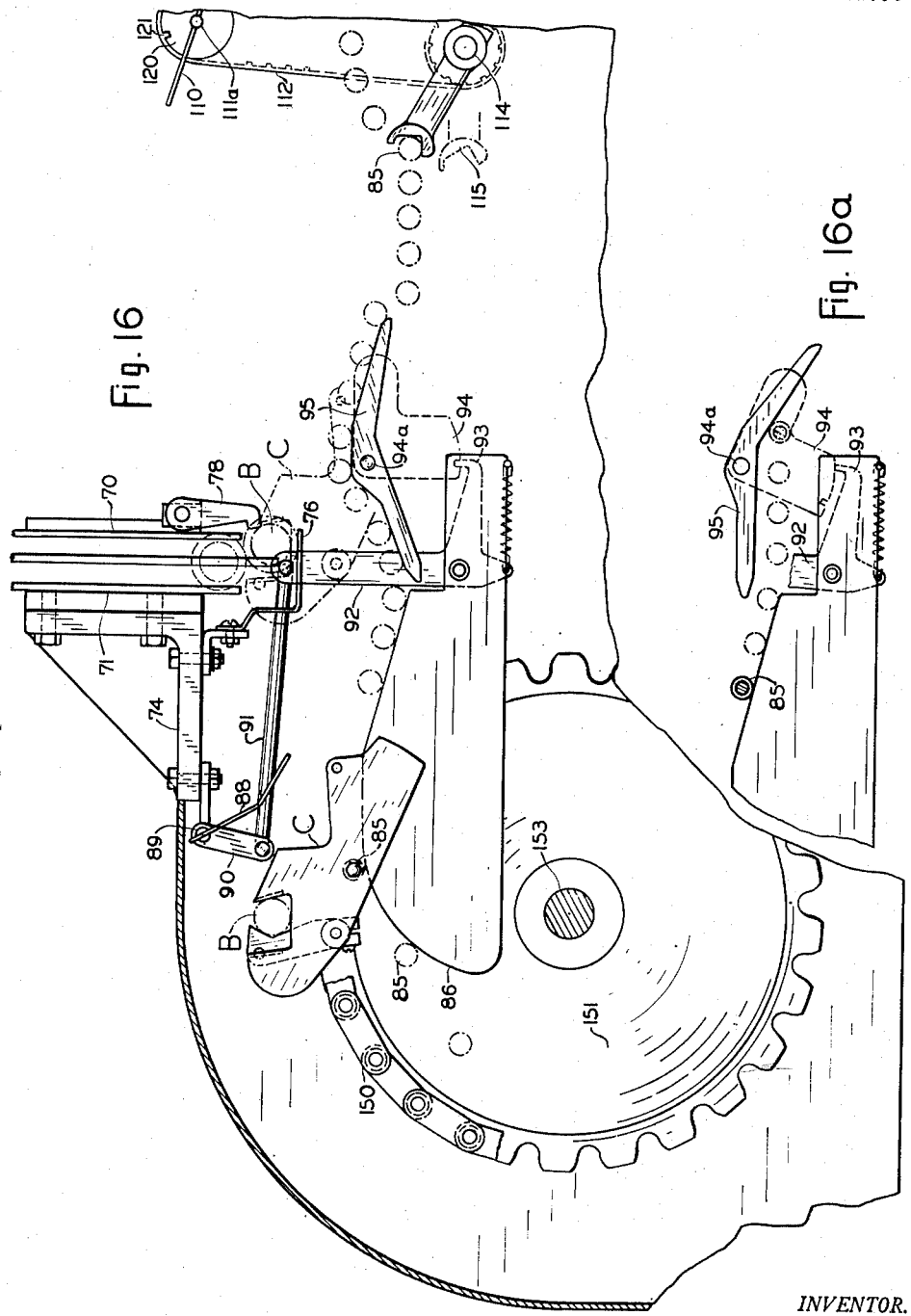

Feb. 16, 1954  G. A. SNOW ET AL  2,669,397
BOBBIN REPLENISHING MECHANISM FOR WINDING MACHINES
Filed Aug. 9, 1952  9 Sheets-Sheet 8
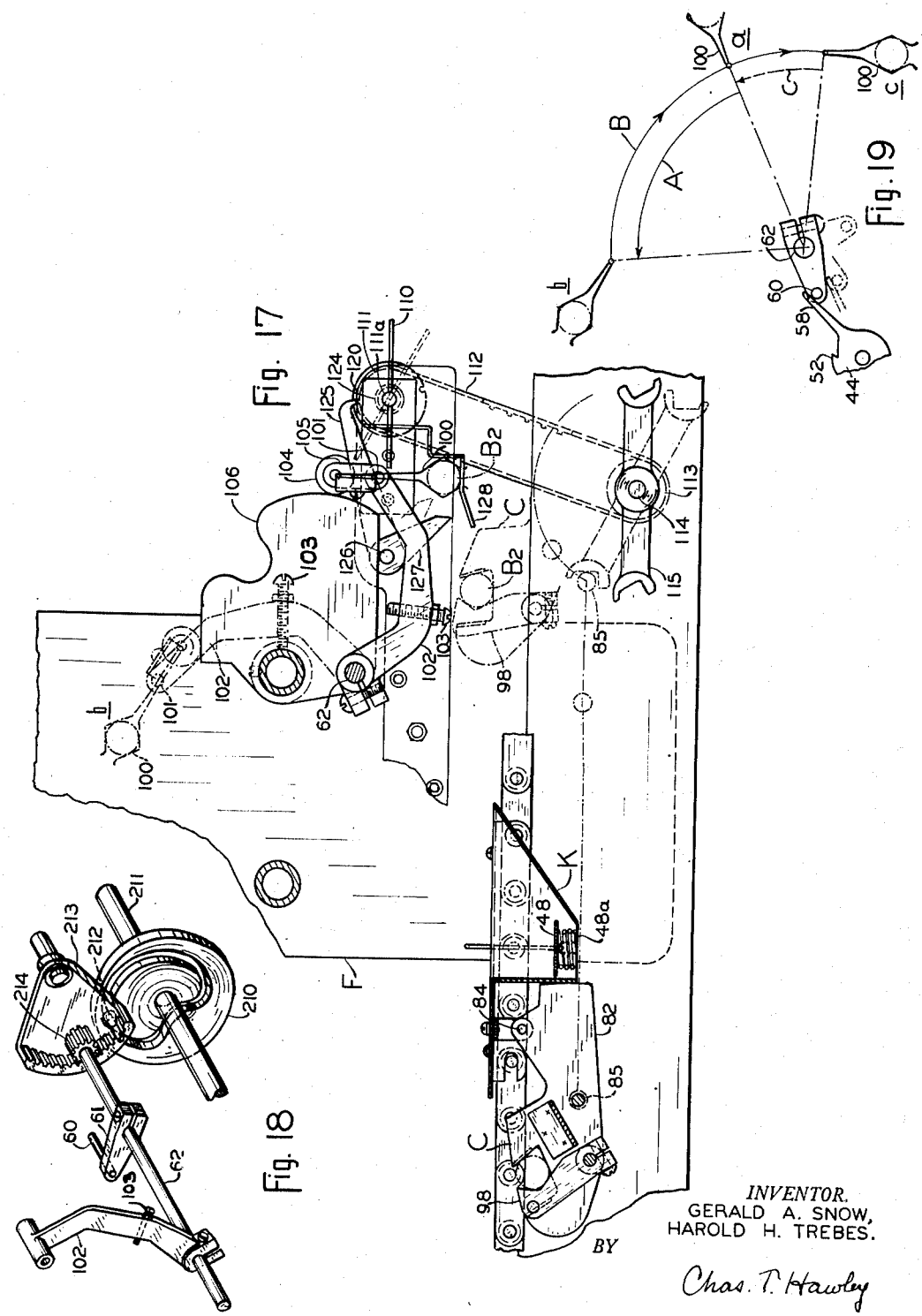
INVENTOR.
GERALD A. SNOW,
HAROLD H. TREBES.
BY Chas. T. Hawley
ATT'Y.

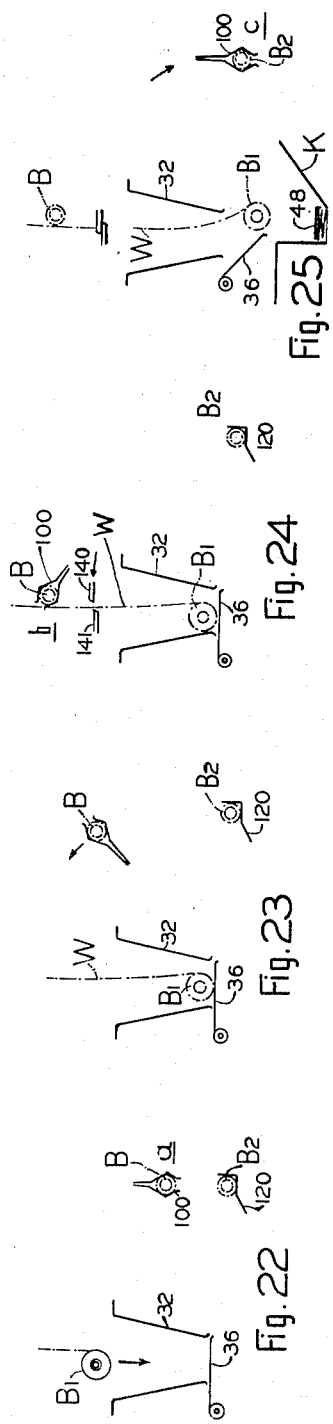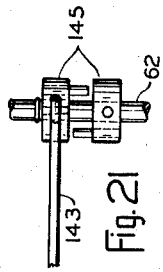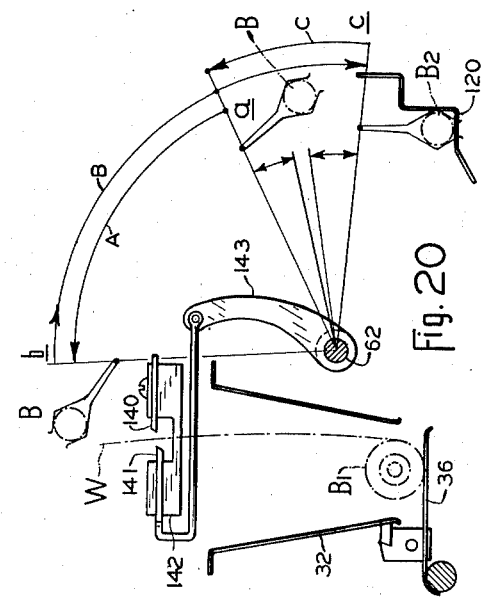

Patented Feb. 16, 1954

2,669,397

UNITED STATES PATENT OFFICE 2,669,397

BOBBIN REPLENISHING MECHANISM FOR WINDING MACHINES

Gerald A. Snow, Uxbridge, Mass., and Harold H. Trebes, Windover Hills, Pa., assignors to Whitin Machine Works, Whitinsville, Mass., a corporation of Massachusetts Application August 9, 1952, Serial No. 303,484

14 Claims. (Cl. 242—35.5)

This invention relates to replenishing mechanism particularly designed for use with a plurality of winding machines but also adapted to supply bobbins or similar objects to other types of machines or for other purposes.

Assuming that the mechanism is being used to service a plurality of bobbin-winding machines, the mechanism comprises a conveyor belt which is continuously advanced along a horizontal path under said associated and adjacent winding machines.

At the head-end of the conveyor, a storage device to supply empty bobbins is provided, and at the opposite end of the conveyor path, provision is made for discharging and suitably disposing of the fully-wound bobbins.

Wherever the word "bobbin" is used in the following specification and claims, it is to be understood as including other forms of weft-carriers, such as cops, quills and pirns.

The replenishing mechanism comprises a plurality of replenishing units mounted in series on the conveyor belt, and each replenishing unit comprises a receptacle or bucket to receive a full bobbin and a cradle which receives an empty bobbin from the storage device and delivers it to a winding machine which requires replenishment.

At each winding machine, a retainer is provided to receive a fully-wound bobbin, and this retainer is provided with a hinged bottom or trap member which is swung downward as an empty bucket passes under the receptacle.

The loaded bucket then continues to the end of the path of conveyor travel and deposits the full bobbin as it moves down for the return run to the head-end of the mechanism.

Special provision is made to delay the opening of the trap supporting the full bobbin until the trailing thread end has been severed.

In the operation of the machine, a full bobbin is dropped into the first empty bucket to pass under said full bobbin, and the new and empty bobbin in the associated cradle is removed and is held in reserve in the first winding machine which requires replenishment. Otherwise, the replenishing units, each with an empty bobbin, will continue their advance under successive machines until a point of desired replenishment is reached.

Our invention further relates to arrangements and combinations of parts which will be hereinafter described and more particularly pointed out in the appended claims.

Reference is to be had to the accompanying drawings, in which

Fig. 1 is a front elevation showing the replenishing mechanism in operative relation to a plurality of winding machine units;

Fig. 2 is a plan view, looking in the direction of the arrow 2 in Fig. 1;

Fig. 3 is a plan view of certain discharge and reloading mechanism associated with each separate winding machine;

Fig. 4 is a side elevation, looking in the direction of the arrow 4 in Fig. 3;

Figure 6:
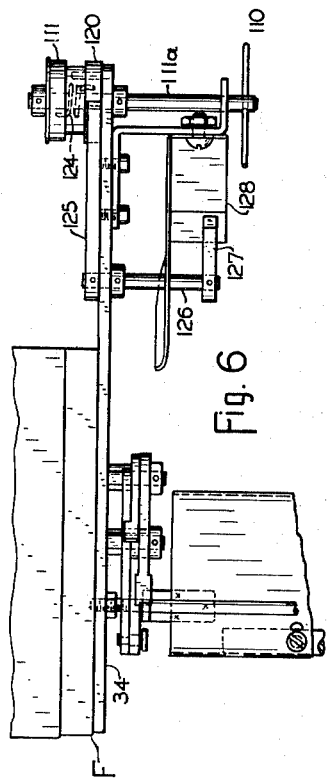
Fig. 6 is a partial plan view, looking in the direction of the arrow 6 in Fig. 5.
Figure 5:
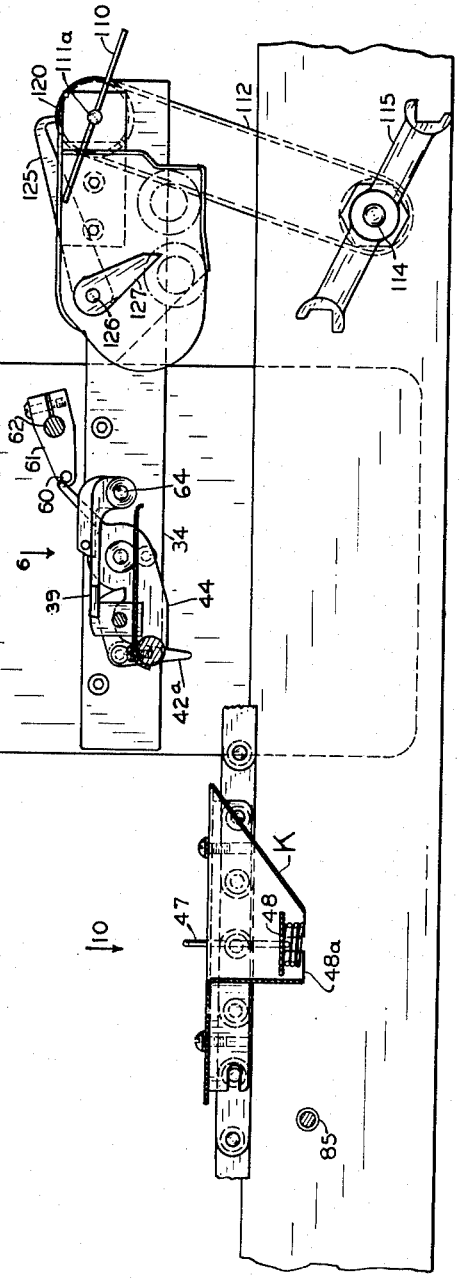
Fig. 5 is a sectional elevation, taken substantially along the line 5—5 in Fig. 3.
Figure 6A:
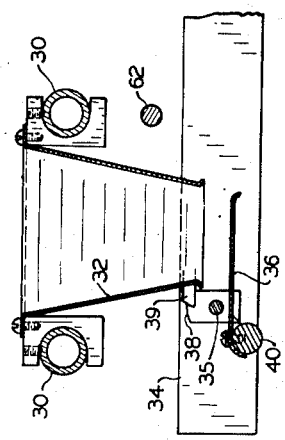

Fig. 6$^a$ is a detail sectional elevation, taken along the line 6$^a$—6$^a$ in Fig. 3;

Fig. 7 is a partial perspective view of a supporting plate for the mechanism for releasing a full bobbin from its receptacle;

Fig. 8 is a perspective view of a trip carrier lever;

Figs. 8$^a$ to 8$^h$ are perspective views of separate detail parts associated with the plate shown in Fig. 7 and shown in assembled relation in Figs. 5 and 6;

Fig. 9 is a perspective view of a hinged bottom member or trap-door;

Fig. 10 is a partial plan view of a conveyor unit, looking in the direction of the arrow 10 in Figs. 1 and 5;

Fig. 10$^a$ is a plan view of a yielding driving connection;

Fig. 11 is a sectional front elevation, looking in the direction of the arrow 11 in Fig. 10;

Fig. 12 is a front elevation of a cradle shown in Fig. 11 but in a lowered and normal position;

Fig. 13 is an end view of the cradle, looking in the direction of the arrow 13 in Fig. 11;

Fig. 14 is a side view of a storage device or magazine;

Fig. 15 is an edge view thereof, looking in the direction of the arrow 15 in Fig. 14;

Fig. 16 is a sectional front elevation of certain bobbin-replenishing mechanism;

Fig. 16$^a$ shows certain parts in Fig. 16 in non-replenishing position;

Fig. 17 is a sectional front elevation of certain bobbin-presenting mechanism;

Fig. 18 is a perspective view of certain mechanism for operating the structure shown in Fig. 17;

Fig. 19 is a motion diagram to be described;

Fig. 20 is a sectional front view of a thread-cutting attachment;

Fig. 21 is a plan view of a lost-motion connection for the thread-cutter;

Figs. 22 to 25 are successive operational diagrams;

Fig. 26 is a plan view of a yielding driving connection to be described; and

Fig. 26ª is a sectional view, taken along the line 26ª—26ª in Fig. 26.

Essential features of the invention relate to the insertion of empty bobbins in depleted cradles on the conveyor, to the release of full bobbins from the winding machines to empty buckets passing thereunder, to the transfer of empty bobbins from reserve position to winding position, and to the supply of new bobbins in reserve position.

Referring to the drawings, a plurality of winding machines X are shown in Fig. 1 in assembled relation with a single conveying and replenishing mechanism which includes a continuously moving conveyor, and a plurality of conveyor units each comprising a bucket K to receive a full bobbin and a cradle C to present an empty bobbin. The assembled units are adapted to service a substantial number of associated winding machines.

In Figs. 3 to 13, we have shown mechanism for receiving and thereafter releasing a full bobbin and for supplying an empty bobbin to the winding machine reserve.

Each winding machine has a fixed frame F provided with cross rods 30 on which a sheet metal retainer 32 (Fig. 6ª) is supported. A plate 34 (Fig. 7) is mounted on the frame F adjacent the retainer 32 and is provided with a rod 35 which supports a bottom member or trap-door 36 (Figs. 6ª and 9). The front end of the rod 35 is similarly supported in a plate 34ª (Fig. 3) mounted at the front of the frame F.

The trap-door 36 has a shoulder 38 (Fig. 9) normally engaged by a latch 39 (Fig. 8ᵈ). A counterweight 40 (Fig. 9) is secured at the left of the pivot 35, as shown in Fig. 6ª, and normally moves the trap-door to its closed position.

The free end of the latch 39 rests on the top of a trip lever 42 (Fig. 8ᵇ) pivotally connected at 43 (Fig. 8ᵇ) and 43ª (Fig. 8) to a carrier lever 44 (Fig. 8) by a stud 45 (Fig. 8ᵉ).

The trip lever 42 has a depending arm 42ª which is positioned for engagement by a pin 47 (Fig. 5) which is associated with a depressible bottom member 48 in each conveyor bucket K. The parts are so arranged that the trip lever 42 will be engaged only when an empty bucket is available to receive a full bobbin. A light spring 48ª raises member 48.

As the trip lever 42 is swung counter-clockwise by engagement with the pin 47, the offset arm of the lever 42 raises the latch 39 to release the trap-door. The latch 39 in turn engages a stud 50 (Fig. 8ᶜ) in a second latch 51 which normally engages a shoulder 52 on the carrier 44 (Fig. 8) which is pivoted on a stud 54 (Fig. 7) in the plate 34. The shoulder 52 is normally held yieldingly against the latch 51 by a spring 55 (Fig. 8ᶠ) mounted within a shell 56 (Fig. 8ᵍ). The shell 56 is secured on the end of the stud 54 by a clamping screw.

The carrier 44 (Fig. 8) has an extension 58 positioned for engagement by a stud 60 (Fig. 8ª) in an arm 61 on a transfer operating shaft 62 pivoted at both ends in the frame F. The pawls or latches 39 and 51 are pivoted on a stud 64 (Fig. 7) in the plate 34.

The parts thus far described operate as follows:

Assuming that the retainer 32 has received a discharged full bobbin B from the winding mechanism, the pin 47 (Fig. 8ᵇ) associated with the first empty bucket will be in raised position and will rock the trip lever 42, thus raising the latch 39 and releasing the trap-door 36, so that the full bobbin B will fall into the associated empty bucket K. Raising of the latch 39 lifts the latch 51 and releases the carrier 44 which is then rocked by the spring 55 to raise the trip lever 42 out of the path of the pin 47. The rod 35 acts as a stop for the carrier 44.

As soon as the full bobbin is dropped, the pin 47 is depressed thereby and the counterweight 40 causes the trap-door 36 to swing upward. The released trip lever 42 then swings clockwise by gravity, thus allowing the latch 39 to re-engage the shoulder 38 and to lock the trap-door 39 in raised position.

It is desirable that the release of this full bobbin from the retainer 32 into an empty bucket K be delayed until the trailing weft end W (Fig. 20) from this bobbin has been severed. Mechanism for effecting this delayed action is shown in Figs. 20 and 21 and will be hereinafter described. The carrier 44 (Fig. 8) is accordingly left unlatched and with the trip lever 42 (Fig. 8ᵇ) raised until the thread-cutting mechanism has operated.

The arm 61 (Fig. 8ª) on the shaft 62 then swings the stud 60 upward to engage the extension 58 (Fig. 8) and swing the carrier 44 counter-clockwise for engagement by the latch 51. This movement of the arm 61 is synchronous with the operation of certain bobbin-replenishing elements to be described.

The full bobbins are carried along to the end of the upper run of the conveyor and they are dumped out as the buckets are inverted in passing to the lower or return run. A guide plate G (Figs. 1 and 2) directs the full bobbins to storage.

In Figs. 14 and 15, we have shown a magazine for supplying empty bobbins to the conveyor units. This magazine comprises side plates 70 and 71 held in spaced relation by studs 73 and mounted on a fixed bracket 74. A guard plate 75 is engaged by the heads of the bobbins B and prevents endwise displacement thereof.

Cross plates 76 and 77 support the butt and tip of the lowermost bobbin, and this bobbin is held from accidental displacement by yielding latches or fingers 78. A fixed lug 79 is mounted between the plates 76 and 77 for a purpose to be described.

The cradle C for the empty bobbins is shown in detail in Figs. 10 to 13 and comprises side plates 82 and a connecting brace member 83, the cradle being pivoted at 84 on an associated bucket K. It is shown in raised or bobbin-receiving position in Fig. 11 and in normal lowered or running position in Fig. 12.

The cooperation of the cradle C and the storage device is best shown in Figs. 16 and 16ª. The cradle C has a roll 85 (Figs. 10 and 13) mounted at one side of the cradle and positioned to engage a fixed cam plate 86 (Fig. 16) as the cradle is carried around the head end by the conveyor of the replenishing mechanism.

As the conveyor chain advances, the cradle C is swung upward to its raised position and is then carried under a feeler finger 88 (Fig. 16) mounted on a pivot shaft 89 which also supports an arm 90 connected by a link 91 to a bell crank lever 92. The free end of the bell crank has a lug 93 which normally engages a notch in a plate 94 mounted on a pivot shaft 94a to which a cam 95 is also secured.

If the raised cradle C carries a bobbin B, the bobbin engages the finger 88 and through the described connections lowers the lug 93 and releases the plate 94 and cam 95. The plate 94 and cam 95 then swing by gravity to the inoperative position shown in Fig. 16a.

If there is no bobbin in the raised cradle C, the finger 88 will not be lifted, so that the cam 95 will remain in the operative position shown in Fig. 16.

As soon as the cradle C passes the finger 88, the roll 85 moves along a downwardly inclined surface of the cam 86 (Fig. 16) and the cradle returns to lowered position. If the feeler 88 has been raised and the cam 95 has been released, the roll 85 now passes under the cam 95 (see Fig. 16a) and the full cradle continues its travel in lowered position. Further movement of the roll 85 causes it to engage and reset the cam 95 and to move the plate 94 for engagement by the pawl 93. These parts are then ready to coact with the next cradle to come along.

If an empty cradle has passed freely under the feeler 88, the cam 95 is left in the position shown in Fig. 16 and the roll 85 travels over the cam 95, thus again raising the cradle C so that it will engage and remove the lowermost bobbin in the storage device.

As the bobbin is thus engaged, a pin 97 (Fig. 12), on a latch 98 on the cradle C is engaged by the lug 79 (Fig. 14) at the bottom of the storage device and is swung backward to permit the lowermost bobbin to enter the raised cradle. The latch 98 is supported on a pivot shaft 99 (Fig. 10) having a tension spring 99a.

As the cradle moves forward and out from under the storage device, the latch 98 is released and swings forward and thereafter yieldingly holds the bobbin in the cradle and from accidental displacement.

The loaded cradle then drops back to normal position, where it remains until it reaches a winding machine which requires bobbin replenishment.

*Winder replenishment*

Mechanism for replenishing the winder with an empty bobbin and for re-loading the replenishing mechanism is shown in Figs. 17 to 19. The mechanism on each winder comprises gripper fingers 100 (Fig. 17) mounted on a shaft 101 carried by arms 102 fixed to the shaft 62 previously described.

A roll 104 is mounted on an arm 105 fixed to the shaft 101, and said roll engages a cam surface 106 associated with the winder frame. As the arm 102 is swung upward by the angular movement of the shaft 62, the roll 104 follows the irregular cam surface 106 and causes the fingers 100 to swing about the axis of the shaft 101, so that they are reversed and present an empty bobbin in alignment with the winding spindle. Final position is determined by a stop screw 103.

The shaft 101 is yieldingly centered by opposed tension springs 107 and 108 (Fig. 4) on the shaft 101, which springs hold the roll 104 yieldingly against the cam surface 106 when the roll is displaced thereby in either direction.

Successive positions of the empty bobbin and associated parts during the replenishing operation are shown in Figs. 22 to 25 inclusive.

The cam mechanism for swinging the shaft 62 is shown in Fig. 18 and comprises a face cam 210 on a shaft 211 associated with the winding machine and given one full revolution at the end of each winding operation.

As the cam 210 is thus rotated, a cam follower roll 212 on a gear segment 213 is oscillated and in turn rotates a pinion 214 to produce an oscillating movement of the shaft 62 which supports the arm 102 and also the arm 61 previously described.

The normal position of the fingers 100 and the empty bobbin B is in the partially raised position *a* shown in Fig. 22. The first ensuing movement is upward through Fig. 23 to position *b* in Fig. 24, this movement being indicated by the arrow A in Fig. 20. The next movement is a full return movement (arrow B) to the position *c* in Fig. 25, and the third movement is a partial upward movement (arrow C) to the original position *a* in Fig. 22.

In Fig. 22, the full bobbin B' is being dropped to the receptacle 32 and the new bobbin B is in the transfer position *a*; in Fig. 23 the full bobbin B' is in the receptacle 32 and the new bobbin B is in process of transfer; and in Fig. 24 the new bobbin B is aligned with the winding spindle and the shears are about to sever the trailing weft end W of the full bobbin B'.

In Fig. 25, the weft end W is severed, the trap-door 36 is open and the full bobbin B' is falling to a bucket K. Also in Fig. 25, the fingers 100 are picking up a replacement bobbin $B^2$ for movement from reserve position to transfer position *a* (Fig. 22).

The transfer of a new bobbin from a conveyor cradle C to the winding machine reserve position *c* is initiated by the removal of the previous reserve bobbin $B^2$ from the reserve position *c* shown in Figs. 17 and 25 to the transfer position *a* shown in Fig. 22.

As the bobbin $B^2$ is thus raised from reserve position *c* (Fig. 25) to transfer position *a* (Fig. 22), the bobbin $B^2$ engages a cross pin 110 (Fig. 17) associated with a sprocket 111 on a shaft 111a connected by a belt 112 to a sprocket 113 mounted on a shaft 114 rotatable in fixed bearings on the winder. The shaft 114 has a double-forked cross arm 115. When the arm 115 is in normal horizontal position, its forked end is out of the path of the rolls 85 on the cradles C, but when in the raised position shown in broken lines, it will be engaged and turned by the next roll 85 during the continued advance movement of the conveyor.

The arms 110 and 115 are moved from their normal horizontal full-line positions to the broken-line positions in Fig. 17 by the described engagement of the arm 110 by the bobbin $B^2$ as it is moved to the position *a* shown in Fig. 22.

The sprocket 111 (Fig. 26) is loosely mounted on the shaft 111a and a disc 120 having opposed notches 121 (Fig. 26a) is fixed to the shaft 111a. The hub portion 122 of the sprocket 111 is recessed at one side as indicated at 122a (Fig 26a).

A stop 123 is mounted in the disc 120 and extends into the segmental recess 122a in the hub 122. A coil spring 124 has its opposite ends seated in the sprocket 111 and disc 120 respectively and maintains the pin 123 yieldingly in the position shown in Fig. 26a.

As the cross-pin 110 is engaged and moved by the reserve bobbin $B^2$ as it is raised to transfer position, the upper notch 121 in the disc 120 will receive the offset end of an arm 125 (Fig. 17) mounted on a rod or short shaft 126 pivoted in a part of the fixed frame F.

When the offset end of the arm 125 enters a notch 121, the disc 120 and shaft 111ª are held from rotation until the arm 125 is lifted.

A trip arm 127 (Fig. 17) is mounted on the shaft 126 and is positioned for engagement by the new bobbin as it is moved by a rocking cradle C to the reserve position on the brackets 128.

The rocking of the cradle C to place a bobbin in reserve position on the brackets 128 is effected by engagement of the roll 85 on the cradle with one forked end of the cross arm 115 after said arm has been moved to its raised or broken line position in Fig. 17, it having been moved to this position by engagement of the arm 110 by a bobbin B² as it was moved to transfer position $a$.

The stud 85 is continuously advanced with the conveyor toward the right in Fig. 17 and as it engages the forked arm 115, the cradle C is swung upward and at the same time the arm 115 and its supporting shaft 114 is swung clockwise, as is also the sprocket 111 on the shaft 111ª. The disc 120, shaft 111ª and cross arm 110 are held from rotation and the spring 124 is tensioned until the new bobbin in the cradle C engages the trip arm 127 thus lifting the latch or arm 125 and releasing the parts shown in Fig. 26. Further partial rotation of the shaft 111ª and associated parts then takes place with a snap action.

These parts thus complete a half-revolution and return to their horizontal full-line positions but with reversed ends. This is the normal operation when the approaching cradle C contains a new bobbin which can engage the trip arm 127 and lift the latch 125.

If there is no new bobbin in the approaching cradle, the disc 120 will remain locked, but the arm 115 and sprocket 113 will be engaged and partially rotated as previously described. Such movement is permitted by the yielding connection of the sprocket 111 to the notched disc 120, but as soon as the pin 85 has moved along to the right in Fig. 17, the spring 124 (Fig. 26) will return the arm 115 to the raised position shown in broken lines in Fig. 17.

The forked end of the arm 115 is thus ready to receive the stud 85 on the next cradle which approaches, and this procedure will be repeated until a cradle containing an empty bobbin comes along and delivers the bobbin to transfer position in the brackets 128 and in doing so, engages the trip arm 127 and unlocks the disc 120.

This holding of the indication for replenishment of a bobbin in reserve position is necessary, as otherwise an empty cradle might rotate the cross arms 110 and 115 to their full-line horizontal positions, and there would then be no reserve bobbin in the brackets 128 to be raised to transfer position and to thus shift the end of one of the arms 115 into position for engagement by a roll 85. Without such engagement, no bobbin thereafter would be placed in reserve position on the brackets 128.

The provision for shearing the trailing weft end W of a full bobbin while it is in the receptacle 32 is indicated in Fig. 20, which shows a fixed shear blade 140 and a movable blade 141 slidable in a block and connected to an arm 143 loose on the shaft 62 previously described.

The arm 143 has a lost-motion clutch connection 145 (Fig. 21) to the shaft 62, so that the blade 141 receives a shearing movement only during the return movement of the shaft 62 from the angular position indicated as $a$ to the position indicated as $c$ in Fig. 20. This movement takes place before the pin 60 (Fig. 8ª) engages the extension 58 (Fig. 8) of the carrier 44 and lowers the part 42ª of the finger 42 into position for engagement by a raised pin 47. Such engagement then releases the trap-door 36.

It is thus insured that the thread attached to a full bobbin deposited in the receptacle 32 will be severed before the bobbin is dropped from the receptacle 32 into an empty bucket K.

The conveyor chains 150 (Figs. 10 and 10ª) are mounted on sprockets 151 secured on a shaft 153 which is continuously rotated by a chain 154 and a sprocket 155 frictionally connected to said shaft, all as clearly shown in Fig. 10ª. This construction provides a "give-way" connection if the conveyor should be blocked in any way.

*General operation*

The general operation of our improved replenishing mechanism has been set forth in detail in the preceding description, but may be briefly summarized as follows:

The replenishing mechanism comprises a conveyor having a plurality of replenishing units each formed with a receiving bucket and with a reloading cradle. Such a mechanism will service any desired number of winding machines positioned in adjacent series.

The winding machines are so constructed that each machine will automatically stop and discharge its full bobbin to an associated receptacle on completion of a winding operation. Provision is made for severing the trailing weft end of the discharged full bobbin, after which the bobbin is dropped into an adjacent empty bucket on the conveyor.

An empty bobbin in transfer position is simultaneously moved into alignment with the winding machine spindle, whereupon the winding cycle recommences.

Suitable provision is made for replenishing the bobbin in transfer position, and also for placing a new bobbin in each empty cradle as such cradles pass under a suitable storage device.

Special devices are also provided for holding an indication of reserve bobbin replacement until a cradle comes along containing an empty bobbin to be used in such replacement.

The entire operation of the replenishing mechanism is automatic and requires no attention from the operator, other than to see that the storage device is suitably supplied with bobbins.

Having thus described our invention and the advantages thereof, we do not wish to be limited to the details herein disclosed, otherwise than as set forth in the claims, but what we claim is:

1. In association with a textile machine, a bobbin-replenishing mechanism comprising means to hold a reserve bobbin, a conveyor having successive units each with a weft bobbin receiver and a bobbin cradle, means to deposit a full bobbin from said textile machine in the first empty receiver to pass under said textile machine after the bobbin therein is fully wound, automatic means to transfer said bobbin from a cradle and means to store the call for replacement of the reserve bobbin until a cradle with an empty bobbin is moved to transfer position.

2. In association with a textile machine, a bobbin-replenishing mechanism comprising a conveyor having successive units each with a bobbin receiver and a bobbin cradle, said cradle being pivoted to said receiver, said textile machine having a reserve bobbin position, and means to raise said cradle to transfer position when said cradle passes under a textile machine having an empty reserve bobbin position.

3. In association with a textile machine, a bobbin-replenishing mechanism comprising a conveyor having successive units each with a bobbin receiver and a bobbin cradle, means to release a full bobbin to an empty bobbin-receiver, and means to prevent such release to a full receiver.

4. In association with a textile machine, a bobbin-replenishing mechanism comprising a conveyor having successive units each with a bobbin receiver and a bobbin cradle, means to release a full bobbin to an empty bobbin-receiver, means to sever the trailing weft end of said bobbin, and means to prevent release of said full bobbin from said receiver until said weft end has been severed.

5. In a winding machine, a pair of bobbin-holding spring fingers, means to swing said fingers from bobbin-receiving position to alignment with the winding spindle, and fixed cam means to control the movement of said fingers during said swinging movement.

6. In a winding machine, a pair of bobbin-holding spring fingers, means to swing said fingers about a primary axis from bobbin-receiving position to alignment with the winding spindle, and fixed cam means effective to control the movement of said fingers during said swinging movement and to swing said fingers additionally about a secondary axis.

7. In association with a textile machine, a bobbin-replenishing mechanism comprising a conveyor having successive units each with a weft bobbin receiver and a bobbin cradle, means to transfer a new bobbin from a cradle to a reserve position, means to indicate such a transfer and means to preserve the indication until a cradle having a new bobbin therein approaches transfer position.

8. The combination in a bobbin-replenishing mechanism as set forth in claim 7, in which the transfer means is repeatedly operated until a new bobbin from a loaded cradle is transferred to reserve position.

9. The combination in a bobbin-replenishing mechanism as set forth in claim 7, in which the indicating means remains in indicating position until a transfer to reserve position is effected.

10. The combination in a bobbin-replenishing mechanism as set forth in claim 7, in which the indicating means remains in indicating position until a transfer to reserve position is effected and in which a yielding connection is provided between the transfer means and the indicating means which permits the transfer means to be moved without moving the indicating means.

11. The combination in a bobbin-replenishing mechanism as set forth in claim 7, in which a cradle-raising member is normally in inoperative position but is raised to cradle-engaging position by upward removal of a bobbin from reserve position.

12. The combination in a bobbin-replenishing mechanism as set forth in claim 11 in which the cradle-raising member, when in raised position, is engaged by a roll on the cradle and swings said roll and cradle upward as said member is moved by said roll.

13. In a winding machine having reserve, replenishing and winding positions, in combination bobbin-gripping devices, and operating mechanism effective to move said devices in a continuous cycle from replenishing position to winding position, then to reserve position and then back to replenishing position, the successive movements of the bobbin-gripping devices being effected by moving a roll associated with said devices over a fixed cam by which said devices are shifted angularly as they are moved to successive positions.

14. In a winding machine having reserve, replenishing and winding positions, in combination bobbin-gripping devices, and operating mechanism effective to move said devices in a continuous cycle from replenishing position to winding position, then to reserve position, and then back to replenishing position, the successive movements of the bobbin-gripping devices being effected by moving a roll associated with said devices over a fixed cam by which said devices are held normally dependent but are substantially inverted as they are moved to winding position, and in which said devices are returned to dependent position as they are moved to grip a bobbin in reserve position.

GERALD A. SNOW.
HAROLD H. TREBES.

References Cited in the file of this patent

UNITED STATES PATENTS

| Number | Name | Date |
| --- | --- | --- |
| 2,045,202 | Reiners | June 23, 1936 |
| 2,236,300 | Reiners | Mar. 25, 1941 |
| 2,350,927 | Reiners | June 6, 1944 |
| 2,543,931 | Peterson | Mar. 6, 1951 |
| 2,646,226 | Gamble | July 21, 1953 |